United States Patent [19]
Hackman et al.

[11] 3,963,214
[45] June 15, 1976

[54] RESILIENT SEATED GATE VALVE WITH SPLIT BODY

[75] Inventors: Frank C. Hackman, Albertville, Ala.; Lawrence F. Luckenbill; Joseph L. Daghe, both of Decatur, Ill.

[73] Assignee: Mueller Co., Decatur, Ill.

[22] Filed: Nov. 26, 1974

[21] Appl. No.: 527,493

[52] U.S. Cl. ............................. 251/326; 251/328; 251/329
[51] Int. Cl.² ...................................... F16K 3/12
[58] Field of Search .................. 251/329, 326, 328

[56] References Cited
UNITED STATES PATENTS

| | | | |
|---|---|---|---|
| 2,870,987 | 1/1959 | Greenwood | 251/328 X |
| 2,947,511 | 8/1960 | McInnes | 251/329 X |
| 3,377,049 | 4/1968 | DeFrees | 251/329 |
| 3,662,778 | 5/1972 | Leopold, Jr. | 251/326 X |

FOREIGN PATENTS OR APPLICATIONS

| | | | |
|---|---|---|---|
| 1,600,753 | 1/1970 | Germany | 251/326 |

*Primary Examiner*—Arnold Rosenthal
*Attorney, Agent, or Firm*—Cushman, Darby & Cushman

[57] ABSTRACT

A gate valve structure for use in mains carrying fluids, the gate valve structure being provided with a casing having a through-bore and a chamber communicating with the through-bore and in which a gate member reciprocates between closed and opened positions of the valve. The valve casing is split into two body members on a plane normal to the axis of the through-bore and one of the body members is arranged to contain all of the functional parts of the valve, including the valve seat, gate member, and actuating means for the gate member. By such an arrangement, the valve seat surrounding the through-bore in the one body member may be easily machined by conventional machining methods and the internal surfaces of both body members may be easily treated to make them non-corrosive. The gate member is provided with a resilient seal member for seating on the valve seat, the seal member being held on the gate member by a retaining ring and the pressure applied by the retaining ring to the seal member may be adjusted at discrete circumferential positions so that the gate member may be adjusted to seat perfectly for a particular valve seat.

27 Claims, 7 Drawing Figures

RESILIENT SEATED GATE VALVE WITH SPLIT BODY

The present invention relates to an improved gate valve structure and, more particularly, to a gate valve structure having a valve casing or housing which is split into two body members on a plane normal to the axis of the through-bore in the valve casing and to an improved seal member for a gate valve, the resilient seal member being capable of adjustment at discrete circumferential positions thereon whereby the gate member can be adjusted to properly seal for a particular valve seat at the time of assembly and installation, and adjusted to compensate for wear.

BACKGROUND OF THE INVENTION

Heretofore, gate valves utilizing a reciprocating gate member have included a cast body member having the through-bore and a valve seat therein surrounding the through-bore and a bonnet attached to the body member which provides a chamber opened to the through-bore and which contains the rising or non-rising valve stem for the gate member and space for the gate member when the valve is open. Such prior gate valve structures are of the type shown in the common Assignee's prior U.S. Pat. Nos. 3,633,873, issued Jan. 11, 1972 to Leopold, Jr. et al; 3,662,778, issued May 16, 1972 to Leopold, Jr. et al; and 3,763,880, issued Oct. 9, 1973 to Leopold, Jr. et al. In the gate valves of the aforementioned patents, the valve seat and the gate member were so designed that when the gate member was in the fully opened position, the through-bore was completely unobstructed, thereby reducing turbulence and currents within the valve structure and providing for smoother flow with less pressure drop. However, the machining of the valve seat about the through-bore with the bottom of the valve seat merging with the through-bore is an expensive operation and does provide some manufacturing difficulties as the machining has to be accomplished either through the opening in the upper part of the casing or through the ports of the through-bore.

In some instances, gate valve structures of the types utilizing a valve body and a bonnet arrangement provided separate seats positioned in the valve body for mating with the gate member. Usually, these arrangements resulted in the through-bore through the valve body being partially obstructed by the inserted valve seats, thus causing turbulence or undesirable currents within the valve body. While the gate valves of the aforementioned patents eliminated such problems, they are costly to manufacture and close tolerance has to be maintained between the valve seat and the gate member.

Efforts have also been made to design gate valve structures wherein the valve casing is split into two or more parts in a plane normal to the axis of the through-bore, but again, difficulties have been encountered in providing a gate valve structure wherein there is smooth, unobstructed flow through the valve seat when opened and which had operating mechanism requiring minimum or low torque for operation. Usually, such valves required complicated actuating mechanism rather than a simple rising or non-rising stem or such valves required an extra part to function as the valve seat with the part being held between the two body members of the valve casing. Additionally, such prior art valves did not have all of the functional parts of the valve, such as the valve seat, the gate member, and the valve stem means located in one body member with the other body member functioning primarily as a closure cap. Consequently, it was difficult to provide adequate sealing where the valve stem means extended through both portions of both body members. Sealing between the two body members was difficult since they did not render themselves easy to provide machine surfaces between the body members which could be made to mate with a gasket therebetween for positive sealing.

Gate valve structures in the prior art have been made with gate members having a resilient seal member attached thereto for cooperating with the valve seat. In such prior constructions, the resilient seal member, which was annular, was sometimes positively held in place by another element, but such other element, although it did cause the seal member to expand upon assembly, was bottomed against the gate member so that the pressure on the seal member could not be adjusted once the seal member was positioned on the gate member. These arrangements presented difficulties in adjusting a gate member for sealing with a particular valve seat as there was always tolerance encountered in the manufacturing or machining of the valve seat. Additionally, such arrangements did not provide adjustment of pressure on the seal member at discrete circumferential positions about the same to accommodate for the wear on the seal member once the valve structure had been installed into a fluid distribution system.

PRIOR ART

The following patents represent prior art patents disclosing either gate valve structures with valve casings split into body members on a plane generally normal to an axis of the through-bore through the valve structure or gate valve structures wherein the gate member utilizes a resilient annular seal member on the same for seating against the valve seating:

| | | |
|---|---|---|
| 1,226,380 | Riley | May 15, 1917 |
| 2,870,987 | Greenwood | Jan. 27, 1959 |
| 2,891,762 | Kellogg | June 23, 1959 |
| 3,001,758 | Ringgenberg | Sept. 26, 1961 |
| 3,085,784 | Dumm | April 16, 1963 |

BRIEF SUMMARY OF THE INVENTION

The gate valve structure of the present invention is primarily utilized for mains carrying fluid under pressure such as mains in water distribution systems. While the gate valve structure may be utilized for small diameter water mains, it also may be utilized in large diameter water mains. It is so designed that it can be inserted into the main with the valve seat, either positioned upstream or downstream of the gate member without affecting the valve's operation in closing off the water disbribution system. The gate valve structure may also be used in other fluid distribution systems, such as chemical, steam, gas, oil, or the like, it being understood that the various parts of the gate valve structure must be made from or coated with materials to inhibit possible corrosive action within the valve structure, depending upon the type of fluid in the system.

The gate valve structure of the present invention includes a valve casing having a through-bore for the flow of fluid, the valve casing having an elongated chamber therein intersecting the through-bore intermediate its ends and defining inlet and outlet ports to the chamber with a valve seat surrounding one of the ports in the through-bore. The valve casing is formed from two body members which are split on a plane normal to the axis of the through-bore, the two body members being secured to each other to define the chamber and the through-bore and one of the body members contains the valve seat, an opening to the exterior of the valve casing on an axis normal to the through-bore, a generally flat gate member, and valve stem means extending through the bore of the one body member, the other body member providing a closure for the first body member.

The arrangement described above provides for easy and inexpensive manufacture of the valve structure as the interior of the one body member is completely exposed to provide for use of conventional machining techniques in machining the valve seat. The arrangement also provides for easy assembly of the parts of the valve as the gate member and its stem means are assembled first in the one body member and then the other body member is attached thereto to enclose the same. The interior of the valve casing may be easily treated to make the same corrosive resistant as the interior surfaces of the two body members, prior to assembly, are easily accessible for coating by spraying, dipping, brushing, or electro-static methods. Another advantage of the gate valve structure mentioned above is that the mating surfaces of the two body members may be machined and a gasket may be provided between the same. Of course, the arrangement also is advantageous in providing guideways having machined surfaces if desired to provide an accurate guide for the gate member. By being able to machine the surfaces of the guideways, a fixed and close control can be maintained between them and the valve or gate seat and this provides uniform seating of the gate member or disc to the body seat without undue sliding across the seat when flow direction is such as to create blowdown of the gate member toward the seat. Additionally, the machined close control of the guideways prevents disc rattle when the gate valve is less than fully opened.

The split body arrangement of the gate valve structure of the present invention wherein the valve casing is formed from two body members split on a plane normal to the axis of the through-bore with one body member containing and retaining all of the functional working parts has an additional advantage in that once the gate valve structure is assembled, it is tamper-proof. Unlike conventional gate valves where a bonnet can be removed and working elements removed while in a fluid distribution system, the present arrangement eliminates removal of working elements once the gate valve structure is assembled into the fluid distribution system.

Another aspect of the present invention is providing a gate valve structure with a gate member having a resilient seal member attached thereto for mating with the valve seat extending around the through-bore. The annular resilient seal member has a bulbous portion for engaging the valve seat and means are provided for retaining the seal member on the gate member, the means including adjustment means for adjusting the pressure on the seal member at discrete positions about the same so that the seal member may be adjusted or fitted for a particular valve seat of the gate valve structure to accommodate tolerances resulting from the forming of the seat, the arrangement thus providing more positive sealing results in the closed position. The adjustment means is used to adjust the pressure on the seal member to elastically deform the same at discrete positions where necessary to provide a proper seal and it may also be used to subsequently compensate for wear on the seal member.

DETAILED DESCRIPTION OF THE INVENTION

Figure 1:
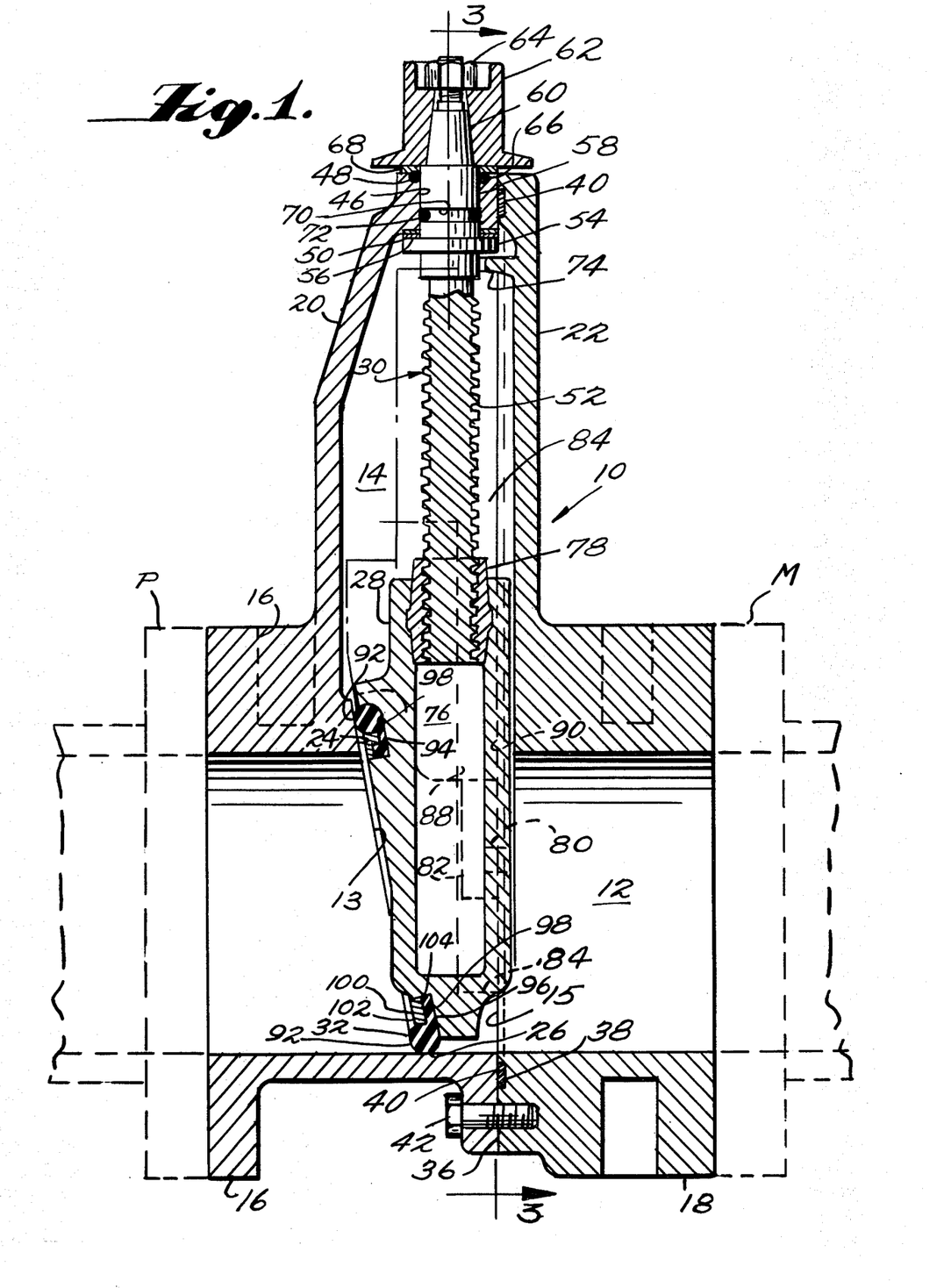
FIG. 1 is a vertical sectional view through the gate valve structure of the present invention taken on a plane parallel to the through-bore of the same and illustrating the gate member in the closed position, the gate member being partially shown in elevation.
Figure 2:
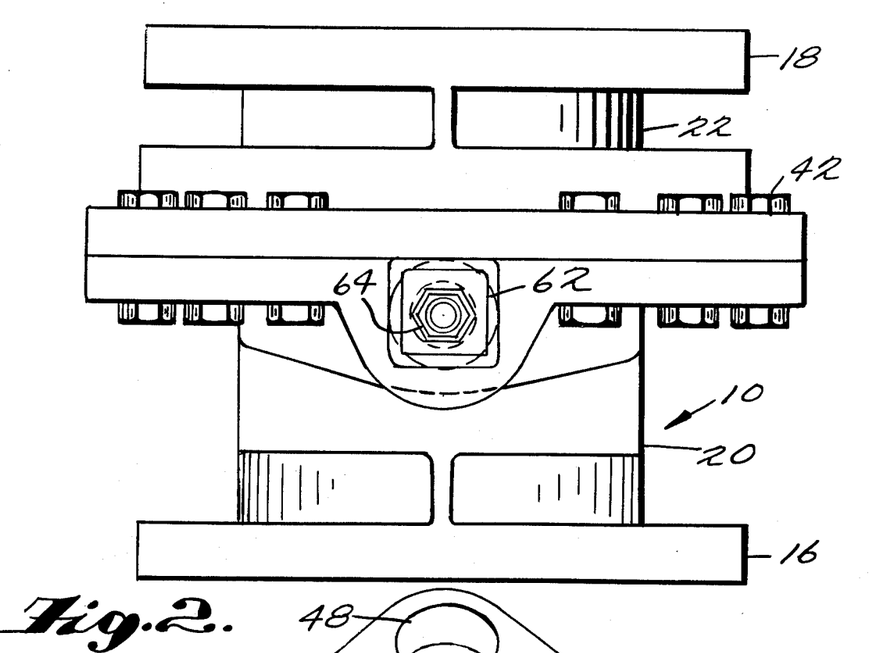
FIG. 2 is a top plan view of the gate valve structure of FIG. 1.
Figure 3:
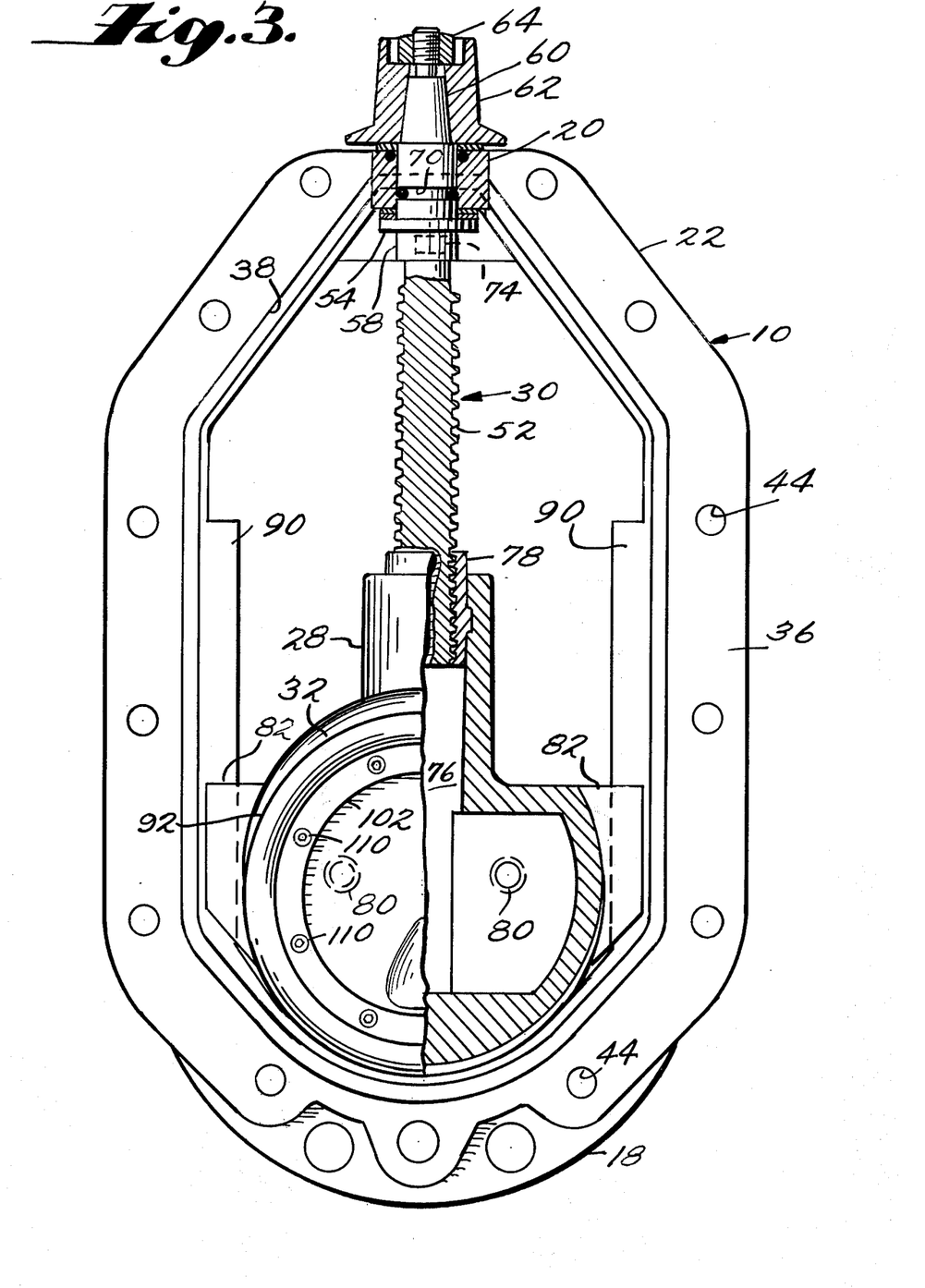
FIG. 3 is a sectional view taken substantially on the line 3—3 of FIG. 1, but with certain portions of the stem means and gate member being broken away.

Referring to the drawings wherein like characters or reference numerals represent like or similar parts, the gate valve structure of the present invention is generally illustrated in FIGS. 1 to 3. In more detail, the gate valve structure includes a valve casing, generally designated at 10, the valve casing being provided with a through-bore 12, a chamber 14 intersecting the through-bore 12 and defining ports 13 and 15 in the through-bore, and flanges 16 and 18 arranged to receive suitable means for attaching the gate valve structure to the pipes or mains P and M, respectively. The ports 13 or 15 may be inlet or outlet ports to the chamber 14, depending upon which way the gate valve structure is inserted into the fluid distribution system. In other words, the gate valve structure is a two-way structure as pressure of the fluid in the fluid distribution system does not affect the sealing upon closing of the valve structure. The valve casing 10 is formed from two shell-like body members 20 and 22, the body members being attached to one another on a plane normal to the axis of the through-bore.

Figure 4:
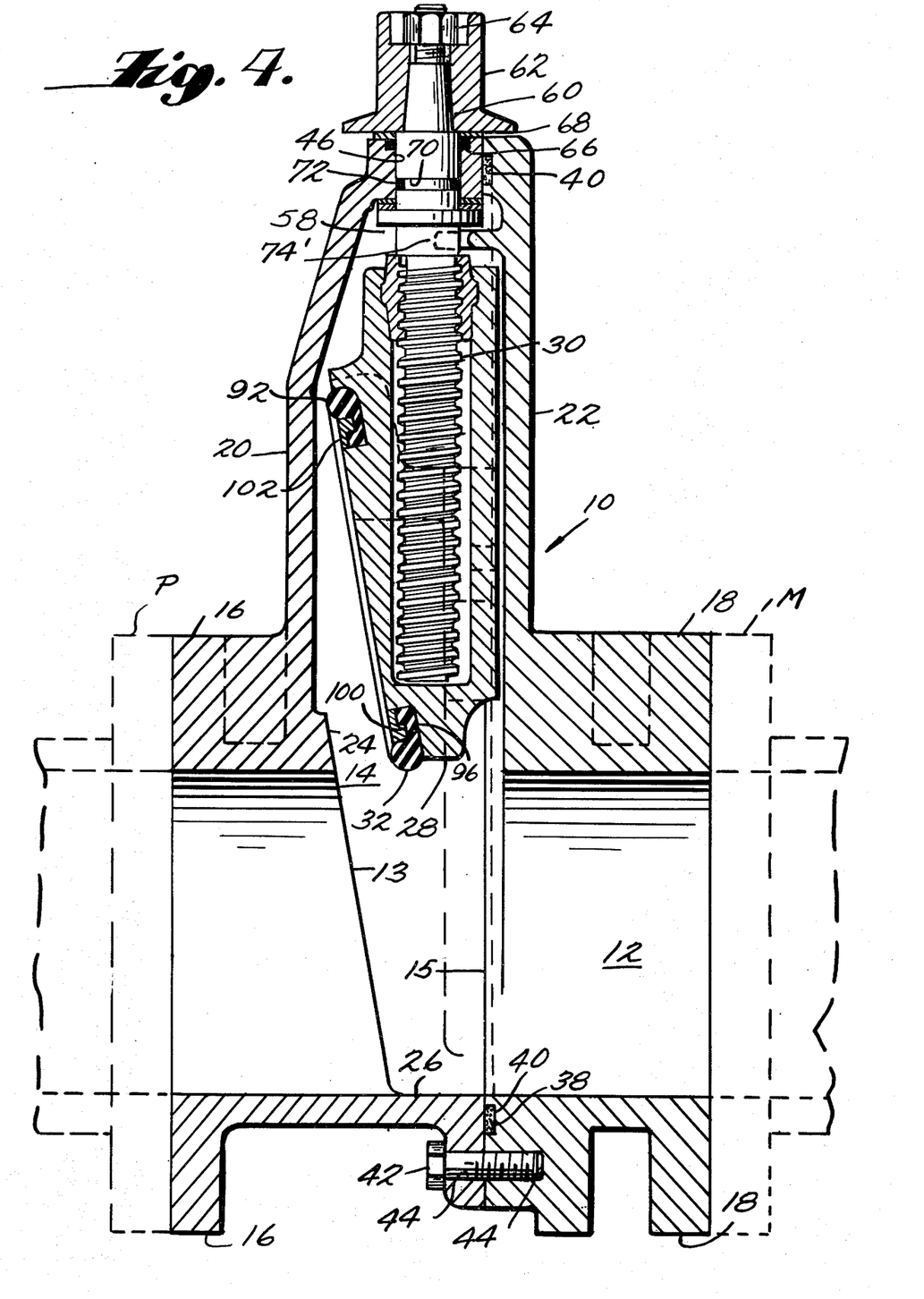
FIG. 4 is a vertical sectional view similar to FIG. 1, but illustrating the gate member in the opened position.

A valve seat 24 surrounds the through-bore 12 at a position where the through-bore is intersected by the chamber 14, the valve seat 24 merging with the bottom portion of the through-bore 12, as indicated at 26. Thus, it will be noted that the through-bore 12 has its bottom portion throughout its entire length completely unobstructed with no bottom cavity for receiving the gate member. Cooperating with the valve seat 24 is a gate or disc member 28, the gate or disc member 28 being reciprocated in the chamber 14 from a closed position (as shown in FIG. 1) to an opened position (as shown in FIG. 4) by valve stem means, generally designated at 30. A more detailed description of the gate member 28 and its resilient annular seal member 32, as well as the valve stem means 30, will follow later in this specification.

Figure 5:
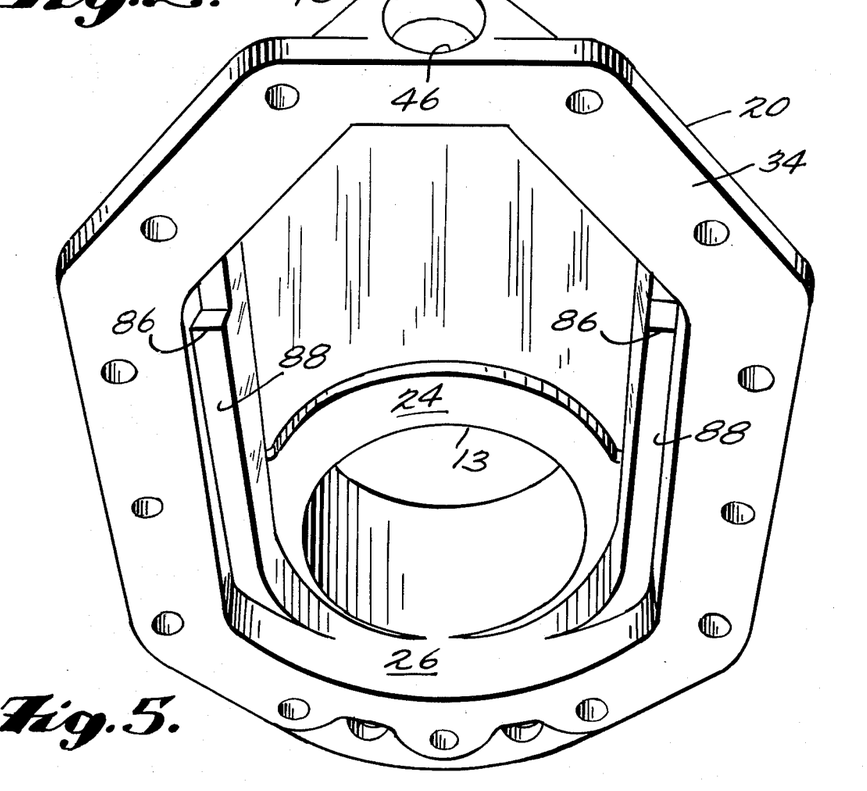
FIG. 5 is a perspective view of one body member of the gate valve structure which is provided with the valve seat and which retains the functional parts of the valve structure.
Figures 6, 7:
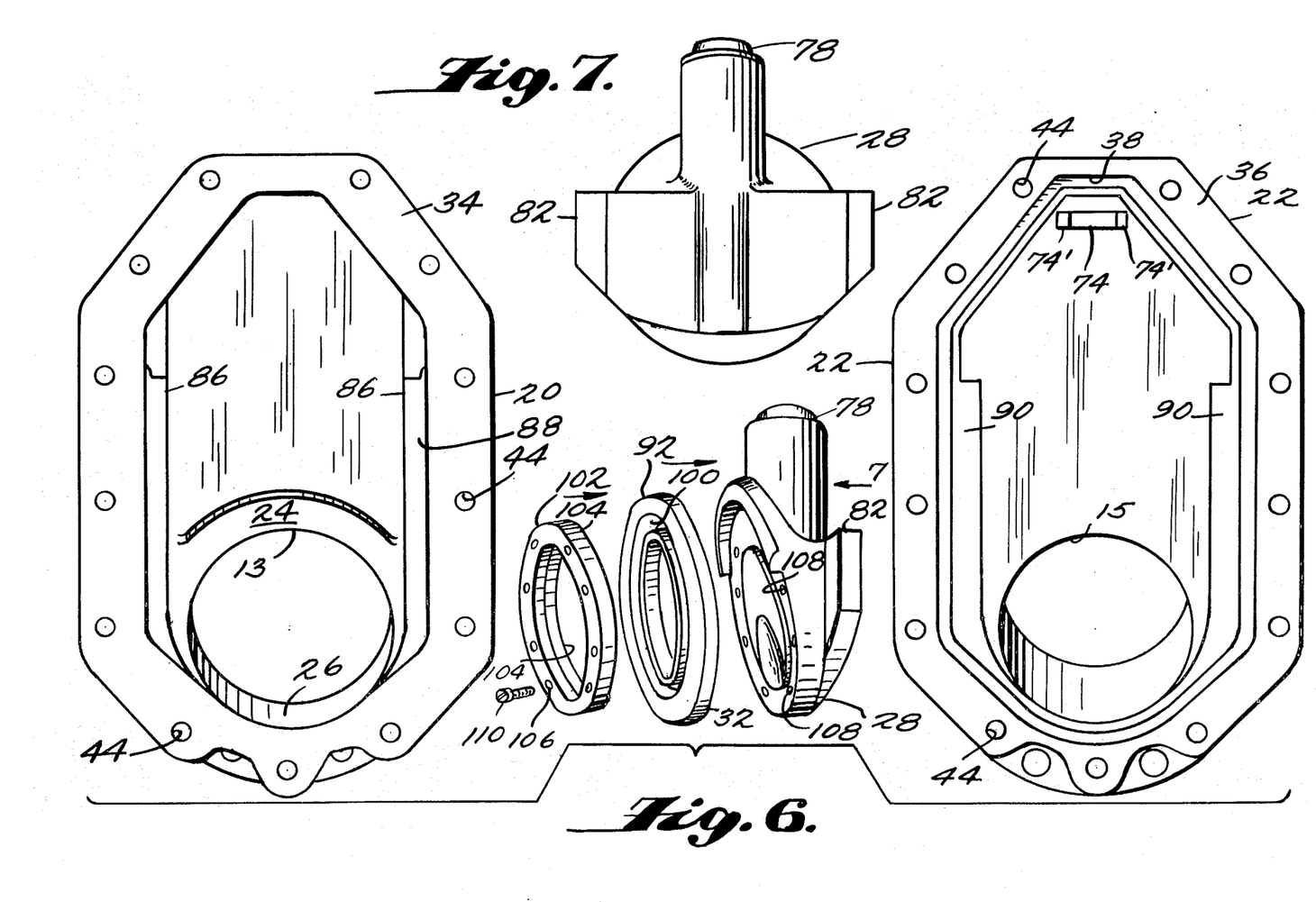
FIG. 6 is an exploded view illustrating the various elements of the gate valve structure, with the exception of the stem means.
FIG. 7 is an elevational view of the gate member looking in the direction of the arrow 7 in FIG. 6.

Referring now to FIGS. 1, 5, and 6, it will be noted that the body members 20 and 22, which are arranged to be secured together on a plane normal to the axis of the through-bore 12, differ in shape in that the body member 20 is arranged to contain and support all of the functional parts of the valve, such as the valve seat 24, the gate member 28, and the valve operating stem means 30, whereas the body member 22, which is shallow with respect to being disc or shell-shaped, functions substantially as a closure member for the body member 20 and forms a portion of the gate valve through-bore for attachment to the pipe P or main M. In more detail, each of the body members 20 and 22 is provided with mating opposed surfaces 34 and 36 about their peripheries, these surfaces being capable of being machined after the body members 20 and 22 have been cast. The member 22 has an endless groove 38 in its face surface 36 for receiving an endless gasket 40 (FIG. 1) which provides a tight seal between the mating face surfaces 34 and 36 when the body members 20 and 22 are bolted together by means of studs and/or bolts 42 passing through aligned holes 44 in the respective body members 20 and 22. As will be appreciated by reference to FIGS. 3, 5, and 6, the interiors of the body members 20 and 22 are completely exposed when the body members are apart and the interior surfaces of the body members may be easily coated to prevent corrosion by spraying, dipping, brushing, or electro-static methods. Also, by having the interior of the cast body member 20 completely open, the valve seat 24 may be easily machined by conventional machining techniques. At this point, it should be noted that the seat 24, which surrounds the port 13, lies generally in a plane transverse of the axis of the through-bore 12, but tapering downwardliy toward the opposite body member 22 and, thus, the seal member 32 seats against the seat member 24 with a slight wedging action, but when the gate member 28 is moved vertically upwardly, there is little or no shearing action on the seal member 32 because the seal member will move rapidly away from the tapering seat.

The body member 20, at its upper end, as shown in FIGS. 1 and 5, is provided with a bore 46 extending through the wall of the same to the exterior thereof, the bore having an axis normal to the axis of the through-bore 12 and coinciding with the vertical and longitudinal axis of the chamber 14. A counter-bore 48 is provided at the outer end of the bore 46 while a second counterbore 50 is provided at the inner end of the bore 46. The valve operating stem means 30 is of the non-rising type and is exteriorly threaded, as indicated at 52, and is provided at its upper end with an annular flange 54 that bears against at least one anti-friction washer 56 carried in the counterbore 50. A non-threaded portion 58 of the valve stem 30 extends through the bore 46 and projects therefrom, as indicated at an end portion 60. The projecting end portion 60 is of non-circular cross section and may be tapered inwardly. An operating nut 62, having a non-circular bore therethrough complementary to the non-circular end portion 60, fits onto the end portion 60 and is held thereon by a nut 64. An O-ring 66 is carried in the counterbore 48 and makes a first seal between the body member 20 and the valve operating stem 30. A suitable anti-friction washer 68 is provided between the operating nut 62 and the body member 20, the washer retaining the seal 66 in the counterbore. The portion 58 of the valve operating stem 30 within the bore 46 is provided with a groove 70 on its exterior surface for receiving an O-ring 72 which makes a second seal between the body member 20 and the valve operating stem, this seal being the more important of the two seals.

In order to support the valve stem 30 when it is desired to change the first seal or O-ring 66, the body member 22 is cast with a projecting member 74 from its interior surface, the projecting member extending at least under the bottom surface of the annular flange 54. Thus, when the operating nut 62 is removed from the end portion 60 of the valve stem 30 to get at the O-ring 66, the valve stem is supported, regardless of the position of the gate member 28.

Gate member 28 is provided with a chamber 76 open at its upper end for receiving the valve operating stem 30 as the gate member is moved out of the through-bore 12 into the upper part of the chamber 14. At the upper end of the chamber 76 in the gate member 28, there is provided an annular brass bushing 78 having interior threads for cooperating with the exterior threads 52 of the valve stem 30. Additionally, the gate member 28 is provided with at least one blowout plug 80 on its backside, the blowout plug 80 functioning as a freeze plug should liquid get in the chamber 76.

The gate member 28 is provided on its side edges with a pair of oppositely disposed and projecting ears 82 which are arranged to ride in guideways 84 formed between the body members 20 and 22 when the body members are assembled to one another. In more detail, the body member 20 is provided with shoulders 86 extending vertically along each side thereof and spaced inwardly from the surface 34 thereof. The shoulders 86 provide face surfaces 88 facing the body member 22, but spaced from similar face surfaces 90 formed in the body member 22. When the two body members 20 and 22 are positioned together, the surfaces 88 and 90 will be spaced apart a distance to allow the ears 82 of the gate member to smoothly travel therein. Of course, since the surfaces 88 and 90 are exposed from the way the body members 20 and 22 are cast and, thus, are easily accessible, these surfaces may be machined if desired to provide a very accurate guideways 84 for the ears 82 of the gate member 28.

As previously described, the projecting member 74 extends outwardly from the interior surface of the body member 22 a distance sufficient to project beneath the bottom surface of the annular flange 54. As shown in FIGS. 1 and 3, this projecting member 74 is cast integrally from the interior surface of the body member 22 and it need only extend a sufficient distance to be under the annular flange 54 when the two body members are assembled. If desired, the end portion of the projecting member 74 may be bifurcated, as indicated at 74' (FIGS. 4 and 6) so that spaced fingers extend on opposite sides of the non-threaded portion 58 of the valve operating stem 30 and beneath the bottom surface of the annular flange 54. This arrangement would provide a slightly stronger stop means for stopping upward movement of the gate member 28 and could be so designed to extend about a part of the cylindrical portion 58 of the valve operating stem 30 so as to provide further stability for the valve operating stem 30. It would still function to support the stem 30 and gate member 28 when change of the O-ring 66 is desired.

Referring now to FIGS. 1, 3, 4, and 6, an important feature of the present invention is providing the annular resilient seal member 32 for the cast disc or gate member 28. The seal member has a bulbous peripheral portion 92 for contact with the valve seat 24 and extending from the inner side of this portion 92 is an inwardly extending flange 94. The flange 94 has a flat surface 96 which abuts and fits flush against a complementary annular flat surface 98 on the gate member 28. An annular groove 100 is provided in the outer face of the seal member 32. An annular retaining ring 102 made of a suitable material, such as stainless steel, brass, or the like, is provided with an annular flange 104 so that it is L-shaped in radial section, the annular retaining ring being arranged to bear against the resilient seal member 32 with its flange 104 in the groove 100 of the seal member. A plurality of holes 106 are provided in the annular retaining ring 102, the holes mating with tapped holes 108 provided in the surface 98 of the gate member 28. Screws 110, which extend through the arcuately spaced holes 106 and are threaded into the tapped holes 108 causing the retaining ring 102 to bear tightly against the seal member 32 to retain the same on the gate member 28. It will be noted that the retaining ring 102 bears solely on the resilient seal member 32 in the direction of the axis of the holes 106 and 108. By such an arrangement, the seal member 32 is held in place by the retaining ring 102 and the seal member can be adjusted by tightening or loosening one or more of the retaining screws 110 and this results in the movement of the resilient seal member at discrete positions about the same to create more or less pressure on the resilient seal member 32 between the same and the valve seat 24. This adjustment provides for accurate fitting of the gate valve structure at assembly and accommodates for any tolerances created during the manufacture of the valve seat 24. The same adjustment may also be used to increase sealing pressures after the gate valve structure has been in use for some time and the seal member 32 has become slightly worn.

The seal member 32 may be made of any suitable elastomeric material such as rubber, rubber-like materials, neoprene, plastics, or the like, so long as the material has sufficient resiliency to make the adjustment for fitting the valve perfectly at the time of assembly or for compensating for wear on the sealing member after a period of use. While the retaining ring 102 and the screws 110 are preferably made of stainless steel, brass, or the like, they may also be made of plastic materials which are harder than the seal member 32. Additionally, it will be noted in FIG. 6 that the retaining ring 102 is made as a separate part from the seal member 32 and is assembled to the seal member and gate member. However, the retaining ring 102 could be attached to the seal member 32 during molding of the seal member, the ring then being provided with the holes 106 for receiving the screws 110, and extending through the same and through the seal member 32 into tapped holes 108 of the gate member 28. This last-mentioned arrangement would still have the adjustable feature to accommodate the seal member 32 for a particular valve seat.

The terminology used throughout this specification is for the purpose of description and not limitation, the scope of the invention being defined in the appended claims.

What is claimed is:

1. A gate valve structure for use in mains carrying a fluid, said gate valve structure comprising:

a valve casing having a through-bore for the flow of fluid, an elongated chamber intersecting said through-bore intermediate its ends and defining inlet and outlet ports to the chamber, and a valve seat surrounding one of said ports in said through-bore;

said valve casing being divided into two body members on a plane normal to an axis of said through-bore, and said body members, when secured to each other, defining said elongated chamber and said through-bore, one of said body members containing said valve seat and being provided with a bore to the exterior thereof having an axis normal to said through-bore;

said valve seat in said one body member lying generally in a plane which converges at an acute angle to a plane normal to the axis of the through-bore and towards the other body member, said valve seat further facing said other body member except at a bottom portion thereof where it merges into and forms a portion of said through-bore of said one body member;

a generally flat gate member reciprocable in said elongated chamber from a closed position across said through-bore and seating against said valve seat to an opened portion out of said through-bore, said gate member including an annular resilient seal member having a bulbous portion for engaging said valve seat;

means for adjustably retaining said seal member on said gate member;

and valve stem means operatively connected to said gate member and extending through said bore in said one body member, said valve stem means being operable to move said gate member between the closed and opened positions.

2. A gate valve structure as claimed in claim 1 in which said one body member is provided with a face extending about its periphery and lying in a plane normal to the axis of said through-bore and in which the other body member is provided with a mating face extending about its periphery and lying in a plane normal to the axis of the through-bore, and means detachably securing said faces together to form said valve casing.

3. A gate valve structure as claimed in claim 2 including a sealing means between the faces of said body members.

4. A gate valve structure as claimed in claim 3 in which said sealing means includes a groove in one of the faces of said body member and a gasket in said groove.

5. A gate valve structure as claimed in claim 4 in which said faces are machined.

6. A gate valve structure as claimed in claim 1 in which said seal member is provided with an inwardly extending flange from its bulbous portion and in which said means for adjustably securing said seal member on said gate member includes a retaining ring bearing against said inwardly extending flange, said retaining ring being held in position by a plurality of circumferentially spaced screws extending through the same and into said gate member, said screws being individually adjustable to cause said retaining ring to apply pressure at discrete positions on said seal member.

7. A gate valve structure as claimed in claim 6 in which said retaining ring is separate from said seal member and is provided with an annular flange on its outer periphery, and in which said inwardly extending flange of said seal ring is provided with an annular groove to receive the flange of said retaining ring.

8. A gate valve structure as claimed in claim 6 in which said retaining ring is molded into said seal member.

9. A gate valve structure as claimed in claim 1 in which said valve stem means is non-rising and includes a valve stem having an end portion extending through said bore and exterior of the valve casing, retaining means carried on the end portion of said valve stem for rotating said valve stem, an annular shoulder on said valve stem spaced inwardly from the outer end of said end portion and operatively and continuously abutting against the interior of said valve casing to permit rotative movement in the bore while restraining the valve stem against axial movement, and sealing means between said bore and the end portion of said valve stem.

10. A gate valve structure as claimed in claim 9 in which said sealing means includes a counterbore on the outer end of said bore in said one body member and a first sealing ring in said counterbore, said sealing ring having predetermined loads exerted thereon by said retaining means and a groove on one of said bores and said end portion of said valve stem positioned below said counterbore and a second sealing ring in said last-mentioned groove.

11. A gate valve structure as claimed in claim 10 including means carried by the other body member and cooperating with the undersurface of said annular shoulder to permit said retaining means to be removed to replace said first sealing ring in said counterbore in fully opened, fully closed, and any intermediate positions of said gate member.

12. A gate valve structure as claimed in claim 11 in which said last-mentioned means includes a projection from the interior surface of the other body member, said projection extending beneath said annular shoulder and abutting said shoulder when said retaining means is removed.

13. A gate valve structure as claimed in claim 12 in which said projection is integrally formed with said other body member and is bifurcated so as to extend on opposite sides of said valve shaft beneath said annular shoulder.

14. A gate valve structure as claimed in claim 1 in which said gate member has a seating surface converging at an acute angle to a plane normal to the axis of the through-bore, said gate member seating against said valve seat by a wedging action.

15. A gate valve structure as claimed in claim 1 in which a bottom portion of said through-bore is substantially unobstructed along its entire length.

16. A gate valve structure for use in mains carrying a fluid, said gate valve structure comprising:
a valve casing having a through-bore for the flow of fluid, an elongated chamber intersecting said through-bore intermediate its ends and defining inlet and outlet ports to the chamber, and a valve seat surrounding one of said ports in said through-bore;
said valve casing being divided into two body members on a plane normal to an axis of said through-bore, and said body members, when secured to each other, defining said elongated chamber and said through-bore, one of said body members containing said valve seat and being provided with a bore to the exterior thereof having an axis normal to said through-bore;
a generally flat gate member reciprocable in said elongated chamber from a closed position across said through-bore and seating against said valve seat to an opened portion out of said through bore, said gate member being provided with oppositely disposed ears and said valve casing being provided with operatively disposed guideways in which said ears are arranged to slide, said oppositely disposed guideways each having one wall integrally formed within the one body member and the other wall integrally formed in the other body member;
and valve stem means operatively connected to said gate member and extending through said bore in said one body member, said valve stem means being operable to move said gate member between the closed and opened positions.

17. A gate valve structure as claimed in claim 16 in which said valve seat in said one body member lies generally in a plane which converges at an acute angle to a plane normal to the axis of the through-bore and toward the other body member.

18. A gate valve structure as claimed in claim 16 in which said valve seat is fully exposed when said one body member is disengaged from said other body member.

19. A gate valve structure as claimed in claim 18 in which said valve seat is machined.

20. A gate valve structure as claimed in claim 16 in which said valve seat faces said other body member, except at a bottom portion thereof where it merges into a portion of said through-bore of said one body member.

21. A gate valve structure as claimed in claim 16 in which said walls of said guideways are machined.

22. A gate valve structure as claimed in claim 21 in which said oppositely disposed ears of said gate member are machined.

23. A gate valve structure as claimed in claim 22 in which said valve seat is machined.

24. In a gate valve structure of the type having a valve casing with a through-bore for the flow of fluid and an elongated chamber intersecting said through-bore intermediate its ends and a valve seat surrounding said through-bore;
a gate member reciprocable in said chamber from a closed position across said through-bore and in engagement with said valve seat to an opened position out of said through-bore, the improvement in sealing means for said gate member comprising:
an annular resilient seal member having a bulbous portion for engaging the valve seat, and means for retaining said seal member on said gate member, said means including means to adjust the pressure on said seal member at discrete positions about the same whereby said seal member may be adjusted for the particular seat of the gate valve structure, said seal member being provided with an inwardly extending flange from its bulbous portion and said means for adjustably retaining said seal member on said gate member including a retaining ring bearing against said inwardly extending flange and a plurality of circumferentially spaced screws extending through the retaining ring and the seal member into said gate member, said screws being individually adjusted to cause said retaining ring to apply pressure at the discrete positions about said seal member.

25. A gate valve structure as claimed in claim 24 in which said retaining ring is separate from said seal member and is provided with an annular flange on its outer periphery, and in which said inwardly extending flange on said sealing ring is provided with an annular groove to receive the flange of said retaining ring.

26. A gate valve structure as claimed in claim 25 in which the gate member is provided with an annular groove to receive the seal member and the retaining ring.

27. A gate valve structure as claimed in claim 24 in which said seal member is made of a moldable material and in which said retaining ring is molded into said seal member.

* * * * *